United States Patent
Alshehri et al.

(10) Patent No.: US 12,251,279 B1
(45) Date of Patent: Mar. 18, 2025

(54) ENDODONTIC IRRIGATION NEEDLE WITH APICAL PLUG AND METHODS OF USE

(71) Applicant: KING SAUD UNIVERSITY, Riyadh (SA)

(72) Inventors: Mohammed Abdullah Alshehri, Riyadh (SA); Ibraheem Rshood Alqwizany, Riyadh (SA); Hesham Abdullah Alzedan, Riyadh (SA)

(73) Assignee: KING SAUD UNIVERSITY, Riyadh (SA)

(*) Notice: Subject to any disclaimer, the term of this patent is extended or adjusted under 35 U.S.C. 154(b) by 0 days.

(21) Appl. No.: 18/673,100

(22) Filed: May 23, 2024

(51) Int. Cl.
*A61C 17/028* (2006.01)
*A61C 5/40* (2017.01)

(52) U.S. Cl.
CPC .............. *A61C 17/028* (2013.01); *A61C 5/40* (2017.02)

(58) Field of Classification Search
CPC ......... A61C 17/02–0208; A61C 17/0217–032; A61C 5/40; A61C 5/46; A61C 5/50; A61C 5/55
USPC ...................................... 433/80, 81
See application file for complete search history.

(56) References Cited

U.S. PATENT DOCUMENTS

| | | | | |
|---|---|---|---|---|
| 3,035,351 | A * | 5/1962 | Hirsch | A61C 17/02 D24/112 |
| 3,919,774 | A * | 11/1975 | Fishman | A61C 5/50 433/224 |
| 4,135,302 | A | 1/1979 | Kronman et al. | |
| 4,276,880 | A * | 7/1981 | Malmin | A61C 17/0208 433/80 |
| 6,162,202 | A | 12/2000 | Sicurelli et al. | |
| 6,638,064 | B1 * | 10/2003 | Nance | A61C 5/40 433/81 |
| 8,358,552 | B2 | 1/2013 | Mazure et al. | |
| 8,808,002 | B2 | 8/2014 | Simons | |

(Continued)

FOREIGN PATENT DOCUMENTS

| CN | 110507440 A | * | 11/2019 |
|---|---|---|---|
| EP | 3473210 B1 | | 6/2020 |

(Continued)

OTHER PUBLICATIONS

Translation of WO 2009116650 (Year: 2009).*

*Primary Examiner* — Edward Moran
*Assistant Examiner* — Matthew P Saunders
(74) *Attorney, Agent, or Firm* — Nath, Goldberg & Meyer; Joshua B. Goldberg

(57) ABSTRACT

An endodontic irrigation needle includes a connection fitting, needle, and apical plug. The needle includes a proximal end joined to the connection fitting, is hollow and forms a conduit for irrigation fluid and a plurality of exit ports for discharging irrigation fluid. An apical plug is formed of a different material than the needle and is permanently bonded to the distal end of the needle. The apical plug may be formed of an elastomeric material such as rubber. The apical plug may be wedge-shaped and include two or more layer portions joined by one or more flexible connecting portions. The layer portions may include a wedge-shaped tip layer, a disc-shaped mid layer, and a tapered top layer. A method for endodontic irrigation includes abutting an apex opening of a root canal with the apical plug, and discharging irrigation fluid through the exit ports of the needle.

13 Claims, 3 Drawing Sheets

(56) References Cited

U.S. PATENT DOCUMENTS

| | | |
|---|---|---|
| 2006/0234182 A1 | 10/2006 | Ruddle et al. |
| 2009/0004621 A1 * | 1/2009 | Quan et al. |
| 2017/0360530 A1 * | 12/2017 | Al Shehri ................ A61C 5/50 |
| 2018/0250106 A1 * | 9/2018 | Gehrig ............... A61C 17/0208 |
| 2019/0365504 A1 | 12/2019 | Shotton et al. |
| 2021/0161620 A1 | 6/2021 | Baratz et al. |
| 2021/0267715 A1 * | 9/2021 | Alcântara ................ A61C 5/50 |

FOREIGN PATENT DOCUMENTS

| | | | |
|---|---|---|---|
| JP | 6845308 | 3/2021 | |
| WO | WO-2009116650 A1 * | 9/2009 | ............... A61B 1/24 |

\* cited by examiner

ENDODONTIC IRRIGATION NEEDLE WITH APICAL PLUG AND METHODS OF USE

BACKGROUND

Field

The disclosure of the present patent application relates to endodontic irrigation, and particularly to an endodontic irrigation needle including an apical plug.

Description of Related Art

Root canal treatment is a dental procedure to treat infection at the center of a tooth. For preserving a tooth that has or could develop a diseased pulp cavity, it is necessary to prevent bacterial proliferation within the root or pulp canal of the tooth by enlarging the canal without excessively weakening the root's wall by using endodontic files, bores, reamers or other instrumentation in order to: 1) mechanically remove as much of the root canal contents as possible; and, 2) allow the introduction of irrigation liquid into the root canal space that dissolves and disinfects organic debris, thus minimizing the presence of bacteria, as well as clearing the walls of the root canal of calcific debris created during instrumentation. After completing steps 1 and 2, the root canal is typically filled with a material such as gutta-percha and a sealer to occlude the pulp cavity and thus seal the root canal. This procedure is referred to as root canal therapy.

Irrigation assists in removing debris and necrotic material remaining after endodontic filers and reamers are used during the shaping and removing steps of the procedure. The irrigation liquid is capable of dissolving or disrupting soft tissue remnants to permit their removal. Some degree of debridement is preferred and any fluid may be used to flush debris from the root canal. General examples of irrigation liquids include water, various alcohols, hydrogen peroxide and sodium hypochlorite. In order to ensure that as much of the debris and necrotic material is removed as possible, the irrigation liquid is typically applied under pressure using a syringe and a needle inserted into the canal.

The role of irrigation is to facilitate and supplement the mechanical action of the root canal instruments. The irrigation of the endodontic system throughout the course of treatment is performed using a disinfecting solution. The solution used is generally 1% to 6% sodium hypochlorite. The irrigation also brings the debris into suspension, making it easier to eliminate said debris, so as to perfect the cleaning of the endodontic system.

The irrigation equipment is therefore composed of a needle connected to a syringe containing the irrigation solution. The connection to the syringe is effected by a traditional connector, such as a Luer lock. Needles are generally of two types: 1) Metallic, cylindrical and of variable length and fineness (23 Ga to 32 Ga), their end being either straight, beveled or with one or more lateral outlets; or, 2) Made of plastic, straight or curved, having a large enough diameter for reaching the apical third region of the root canal.

As studies have shown, the part of the root canal that is the most difficult to clean remains the apical third, in particular the last 3 millimeters, which a traditional irrigation needle made of metal cannot typically access, either due to the fineness and/or curvature of the root canal or because of other anatomical complexities.

The many commercial attempts at an irrigation needle have been unable to offer a side vented needle with tip size to match the final preparations that block the portal of exit in a canal (i.e. apex opening), allowing for a safe irrigation process. Hence, the present disclosure proposes to resolve and surmount existent technical difficulties to eliminate the aforementioned shortcomings of the prior art.

SUMMARY OF THE INVENTION

An endodontic irrigation needle is provided herein, including a connection fitting configured for engagement with a source of irrigation fluid, a needle, and an apical plug. The needle includes a proximal end and a distal end, the proximal end is joined to the connection fitting. The needle is hollow and forms a conduit for irrigation fluid to flow within, and includes a plurality of exit ports for the discharge of irrigation fluid. An apical plug is included, which is formed of a different material than the needle and is permanently bonded to the distal end of the needle.

The apical plug may be formed of an elastomeric material, such as rubber, and may be wedge-shaped. The apical plug may include two or more layer portions joined by one or more flexible connecting portions. The layer portions may include, for example, a wedge-shaped tip layer, a disc-shaped mid layer, and a tapered top layer. The needle may be of a generally columnar shape and have a uniform circular cross-sectional area along its length. The needle may be formed of, for example, nickel-titanium.

Further disclosed herein is a method for endodontic irrigation. The method includes inserting an irrigation needle into a root canal. The irrigation needle includes a connection fitting connected to a source of irrigation fluid, and a needle portion having a proximal end attached to the connection fitting. The needle is hollow and forms a conduit for irrigation fluid to flow within, and includes a plurality of exit ports for discharging the irrigation fluid. An apical plug formed of different material than the needle portion is bonded to the distal end of the needle portion. The method includes abutting an apex opening of the root canal with the apical plug, and discharging irrigation fluid through the exit ports of the irrigation needle. The exit ports are arranged on laterally opposite sides of the irrigation needle and the method includes discharging the irrigation fluid at divergent angles in a V-shape manner in the direction of the apex opening. The apical plug is of a cross sectional area larger than that of an apex opening in the root canal. The apical plug prevents irrigation fluid from flowing past the apex opening of the root canal.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1A:
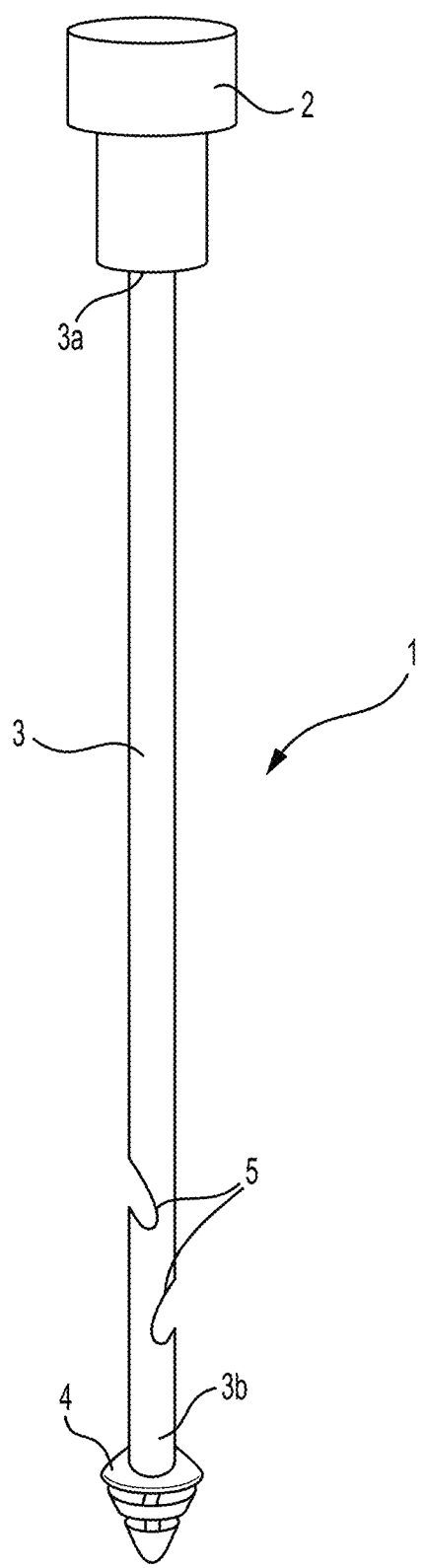
FIG. 1A is a front perspective view of an endodontic irrigation needle.
Figure 1B:
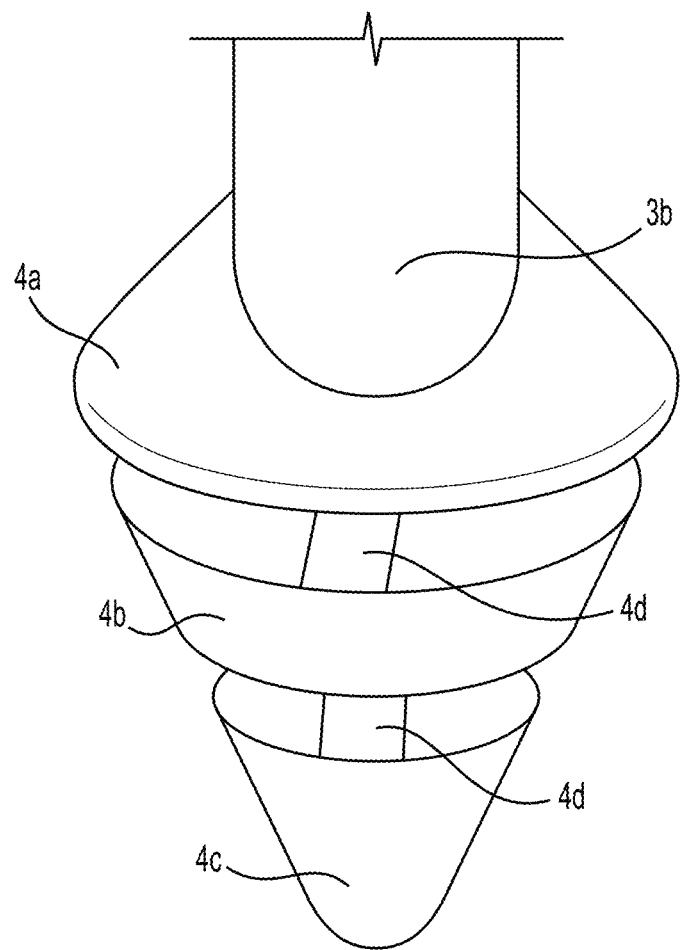
FIG. 1B is a close-up view of an apical plug of an endodontic irrigation needle.

With reference to FIGS. 1A and 1B, an endodontic irrigation needle 1 is provided, including a connection fitting 2, needle portion 3 (also referred to as "needle 3" herein), and apical plug 4. Connection fitting 2 forms part of, for example, a Luer Lock, and is configured for engagement with a source of irrigation fluid, such as a syringe containing hydrogen peroxide or sodium hypochlorite. Needle 3 includes proximal end 3a and distal end 3b, the proximal end 3a is joined to the connection fitting 2. Needle 3 is hollow and forms a conduit for irrigation fluid to flow within and includes a plurality of exit ports 5 for the discharge of irrigation fluid. The needle 3 may be of a columnar shape and have a uniform circular cross-sectional area along its length. The columnar shape of the needle allows for greater flow of irrigation fluid as compared to a tapered needle design, particularly in the most important part of the root canal, the apical zone. The needle may be formed of any suitable material providing versatility and flexibility given the size and shape of the needle. Example material includes, but is not limited to, nickel-titanium.

The apical plug 4 is formed of a different material than the needle 3 and is permanently bonded to distal end 3b of the needle 3 by any suitable method such as adhesive bonding, mechanical bonding/fastening, or over-molding. The apical plug 4 may be formed of an elastomeric material, such as rubber.

As shown in the non-limiting example of FIG. 1B, apical plug 4 may be wedge-shaped, and include two or more layer portions 4a-c joined by one or more flexible connecting portions 4d. The apical plug may include a wedge-shaped tip layer 4c, disc-shaped mid layer 4b, and tapered top layer 4a. The segmentation of the rubber tip into sections provides for enhanced flexibility, and ready conformance to the intricate anatomy of the apical portal exit.

Figure 2:
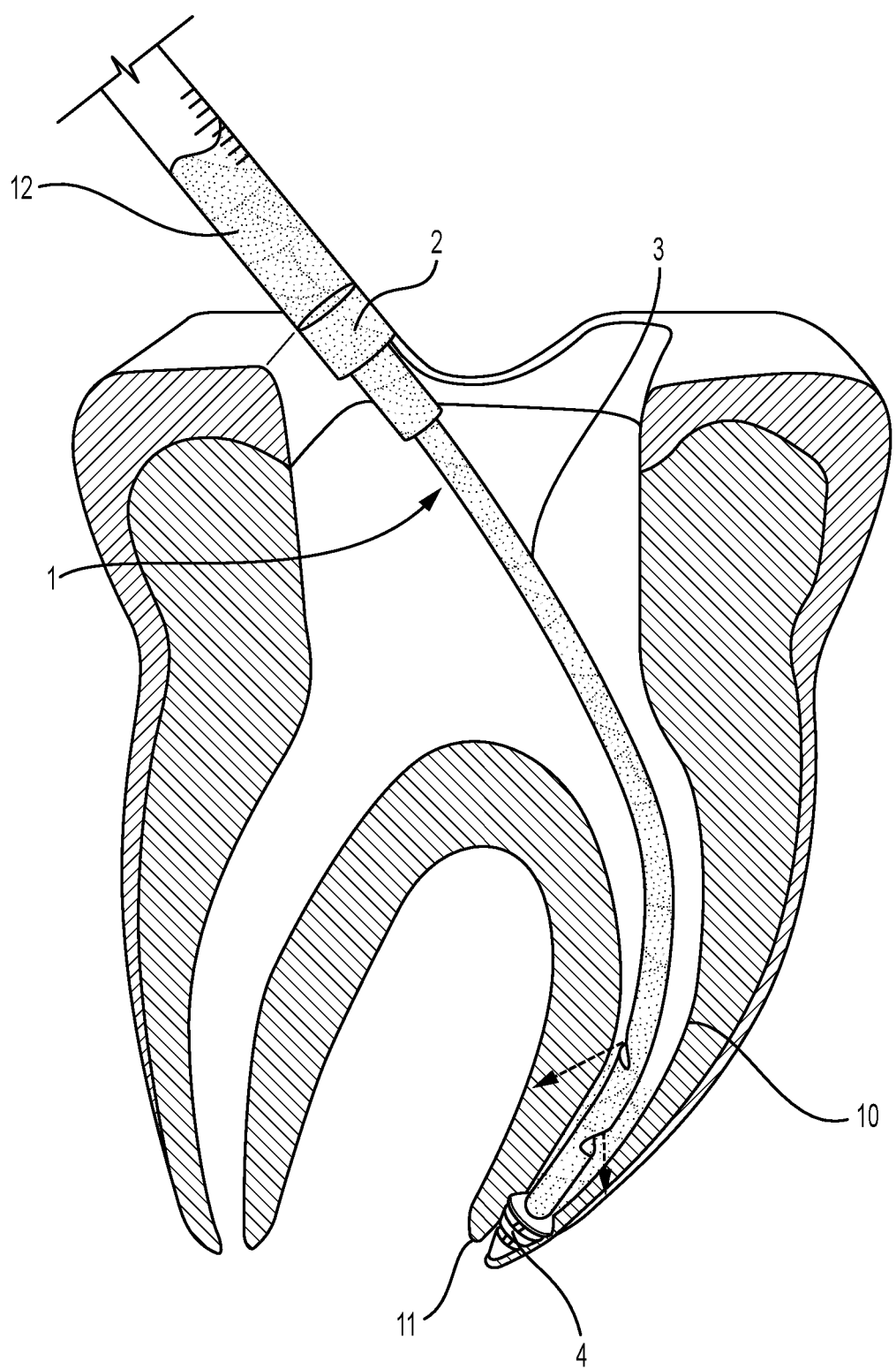
FIG. 2 is a cutaway view of a tooth undergoing endodontic irrigation using the needle of FIG. 1.

Further disclosed herein is a method for endodontic irrigation, which will be described with reference to FIG. 2. The method includes inserting the endodontic irrigation needle 1 into a root canal 10 having been previously cleared of pulp by endodontic files, bores, reamers or other instrumentation. The method includes abutting an apex opening 11 of the root canal with the apical plug 4, and discharging irrigation fluid 12 through the exit ports 5 of irrigation needle 1. Exit ports 5 are arranged on laterally opposite sides of the irrigation needle 1 and are discharged at divergent angles in a V-shape manner in the direction of apex opening 11. Exit ports 5 are sized and shaped such that irrigation fluid escapes freely from the ports 5 while not flowing back within needle 1. The apical plug 4 is of a cross sectional area larger than that of an apex opening 11 in the root canal 10 such that irrigation fluid 12 is prevented from flowing past the apex opening 11 of the root canal 10, thus preventing potential infection and damage to the nerves and tissues surrounding the root canal 10.

It is to be understood that the endodontic irrigation needle with apical plug is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. An endodontic irrigation needle, comprising:
    a connection fitting configured for engagement with a source of irrigation fluid;
    a needle, wherein the needle includes a proximal end connected to the connection fitting, and wherein the needle is hollow and forms a conduit for irrigation fluid to flow within, and wherein the needle includes a plurality of exit ports for discharging irrigation fluid; and
    an apical plug, wherein the apical plug is formed of a different material than the needle and is permanently bonded to a distal end of the needle and wherein the apical plug includes a wedge-shaped tip layer, a tapered disc shaped mid layer, a tapered top layer, a first flexible connecting portion joining the wedge-shaped tip layer and the tapered disc shaped mid layer, and a second flexible connecting portion joining the tapered disc shaped mid layer and the tapered top layer.

2. The endodontic irrigation needle as recited in claim 1, wherein the apical plug is formed of an elastomeric material.

3. The endodontic irrigation needle as recited in claim 2, wherein the apical plug is formed of rubber.

4. The endodontic irrigation needle as recited in claim 1, wherein the apical plug is wedge-shaped.

5. The endodontic irrigation needle as recited in claim 1, wherein the needle is of a uniform circular cross-sectional area along its length.

6. The endodontic irrigation needle as recited in claim 1, wherein the needle is formed of nickel-titanium.

7. A method for endodontic irrigation, comprising:
    inserting an irrigation needle into a root canal, wherein the irrigation needle comprises:
        a connection fitting connected to a source of irrigation fluid;
        a needle portion having a proximal end connected to the connection fitting, wherein the needle portion is hollow and forms a conduit for irrigation fluid to flow within, and wherein the needle portion includes a plurality of exit ports for discharging the irrigation fluid; and
        an apical plug formed of different material than the needle portion, the apical plug permanently bonded to a distal end of the needle portion and wherein the apical plug includes a wedge-shaped tip layer, a tapered disc shaped mid layer a tapered top layer, a first flexible connecting portion joining the wedge-shaped tip layer and the tapered disc shaped mid layer, and a second flexible connecting portion joining the tapered disc shaped mid layer and the tapered top layer;
    abutting an apex opening of the root canal with the apical plug; and
    discharging irrigation fluid through the exit ports of the irrigation needle.

8. The method for endodontic irrigation as recited in claim 7, wherein the exit ports are arranged on laterally opposite sides of the needle portion and wherein the irrigation fluid is discharged at divergent angles in the direction of the apex opening.

9. The method for endodontic irrigation as recited in claim 7, wherein the apical plug is formed of an elastomeric material.

10. The method for endodontic irrigation as recited in claim 7, wherein the apical plug is formed of rubber.

11. The method for endodontic irrigation as recited in claim 7, wherein the apical plug is wedge-shaped.

12. The endodontic irrigation needle as recited in claim 1, wherein the apical plug is widest at the tapered top layer and progressively narrower downward to the wedge-shaped tip layer.

13. The method for endodontic irrigation as recited in claim 7, wherein the apical plug is widest at the tapered top layer and progressively narrower downward to the wedge-shaped tip layer.

* * * * *